United States Patent [19]

Azimi

[11] 3,877,072

[45] Apr. 8, 1975

[54] CASSETTE-LIKE TRANSCRIPTION ADAPTING DEVICE

[75] Inventor: Jafar Azimi, Brampton, Ontario, Canada

[73] Assignee: Executive Dictating Machine Limited, Brampton, Ontario, Canada

[22] Filed: Dec. 19, 1972

[21] Appl. No.: 316,483

[30] Foreign Application Priority Data

Oct. 27, 1972 Canada ............................... 153927

[52] U.S. Cl. ........................ 360/94; 360/93; 360/96

[51] Int. Cl. ....................... G11b 15/26; G11b 23/04

[58] Field of Search ............ 360/94, 96, 93; 242/55, 242/19 A, 199; 179/100.1 A; 226/168

[56] References Cited

UNITED STATES PATENTS

| | | | |
|---|---|---|---|
| 3,632,894 | 1/1972 | Bretschneider | 360/94 |
| 3,644,684 | 2/1972 | Tsuji | 360/94 |
| 3,703,295 | 11/1972 | Yamamoto | 360/94 |
| 3,777,073 | 12/1973 | Kokubo | 360/94 |
| 3,800,321 | 3/1974 | Bolick, Jr. | 360/94 |

*Primary Examiner*—Alfred H. Eddleman
*Attorney, Agent, or Firm*—Finnegan, Henderson, Farabow and Garrett

[57] ABSTRACT

A novel drive conversion mechanism for use with a "Stenorette" type dictating machine is disclosed which permits the transcription of a cassette tape directly on the device but in combination with the dictating machine which imparts to the device rotational motion for transporting the magnetic tape within the cassette and whereby the device is provided with an electrical connection for communicating the electrical impulses of its readhead to the dictating machine whereby transcription is achieved.

5 Claims, 4 Drawing Figures

CASSETTE-LIKE TRANSCRIPTION ADAPTING DEVICE

This invention relates to an adapter device for a dictaphone machine.

Certain dictating machines provide for the use of portable tape cassettes while others do not. The dictating machine sold under the trade mark "Stenorette" by Dejur Grundig of West Germany is of this category. Particularly that model sold under the registered trade mark EXECUMATIC The invention therefore relates to a special driving mechanism adapted for use with the Stenorette which converts the rotary motion of the drivespool of the Stenorette to rotary motion for driving a tape of a portable cassette of magnetic tape of a portable cassette of magnetic tape so that the portable cassette can be transcribed from the Stenorette without need of re-recording the portable cassette tape onto standard Stenorette tape as is now the practice.

The invention therefore achieves a simple coupled driving mechanism for use on a Stenorette dictating transcription machine.

The invention therefore contemplates in combination with a cassette having take-up and feed spools with magnetic tape wound from one to the other, an adapting drive mechanism for use on a magnetic tape transcription machine having protruding take-up and feed wheels, said driving mechanism comprising:

a. a housing;

b. a readhead attached to said housing for reading a travelling magnetic tape;

c. means for receiving in engagement with said readhead a portion of magnetic tape traveling dispersed between take-up and feed spools of the cassette.

d. means for engaging the take-up wheel of said machine and imparting its rotational motion to the take-up spool whereby transport of tape across the head takes place.

The present invention will now be described by way of example with reference to the accompanying drawings in which.

Figure 1:
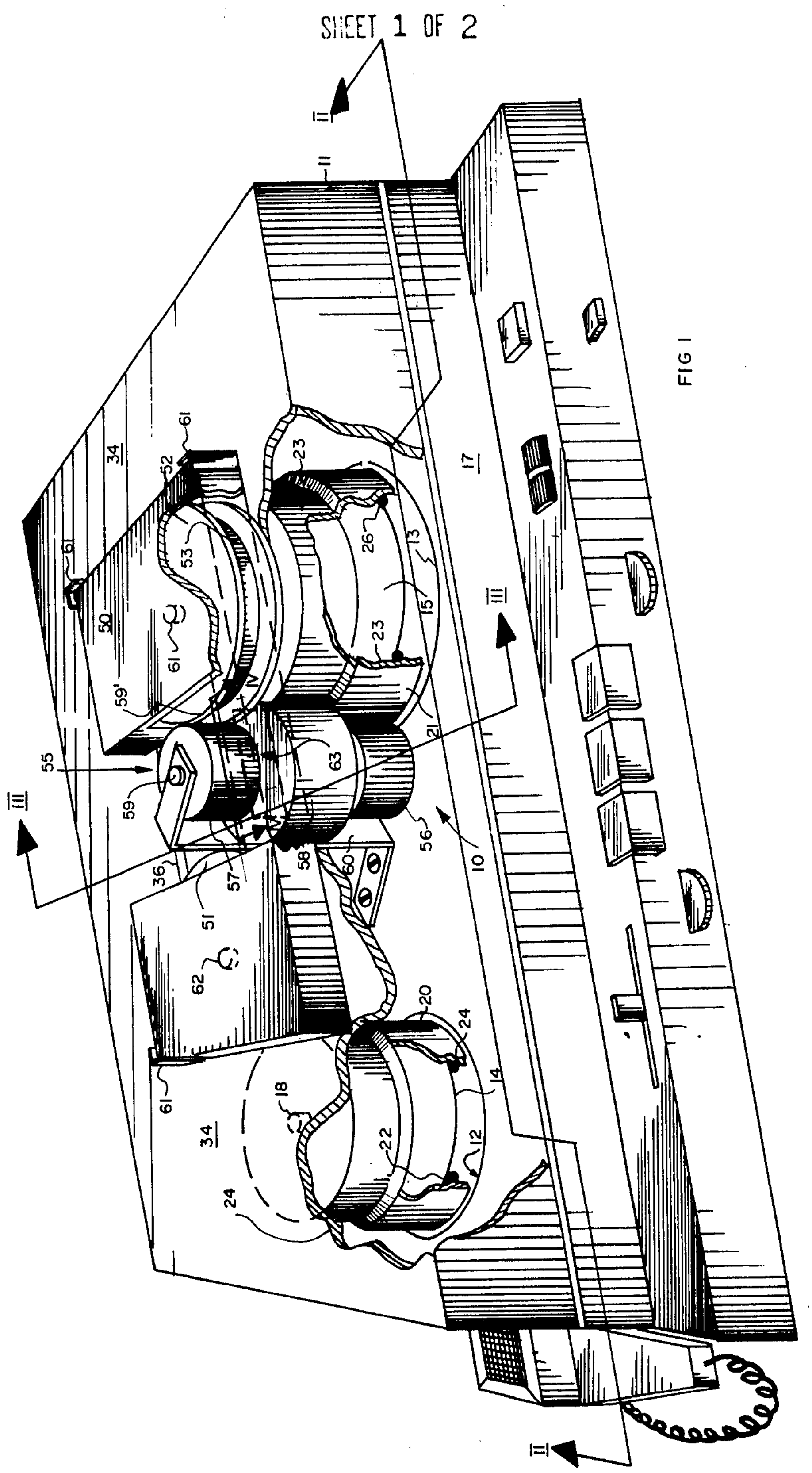
FIG. 1 is a perspective view of the drive mechanism mounted for use on a magnetic tape dictating machine.
Figure 2:
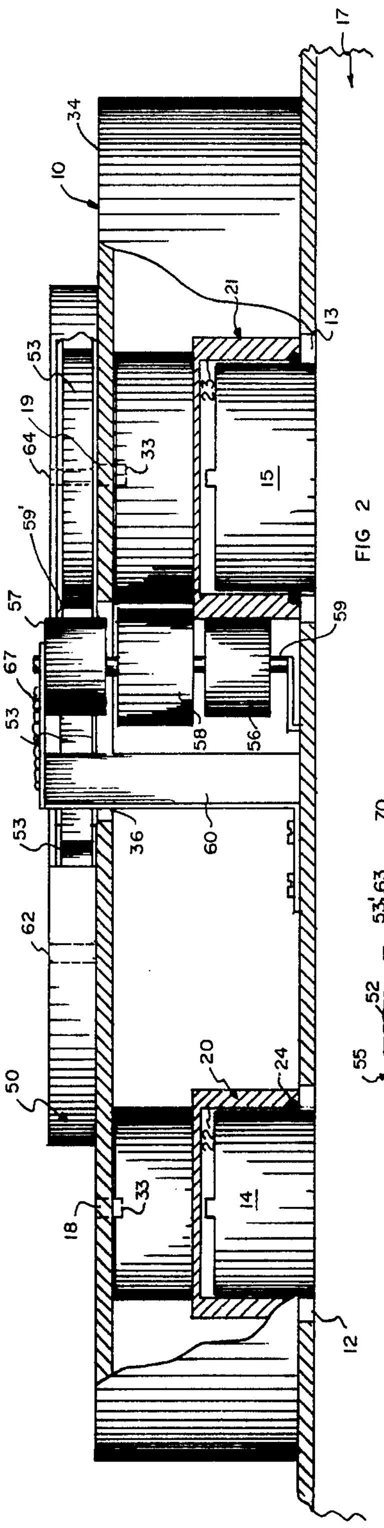
FIG. 2 is a partial section along lines 2—2 of FIG. 1.
Figure 3:
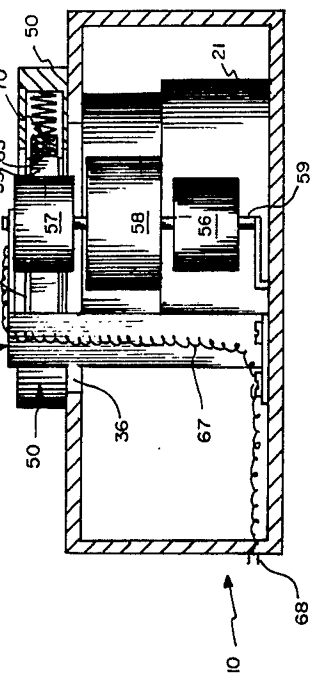
FIG. 3 is a section along lines 3—3 of FIG. 1.
Figure 4:
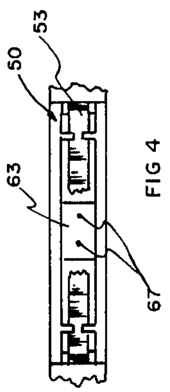
FIG. 4 is a section along lines 4—4 of FIG. 1.

Referring to FIG. 1 the adapting drive mechanism 10 includes a supporting housing 11 having two orifices 12 and 13 adapted for receiving protruding take-up and feed wheels 14 and 15 of a magnetic tape dictating machine 17. The housing 11 carries supporting members 18 and 19 for depending therefrom feed sprocket 20 and take-up sprocket or annular member 21 respectively, each sprocket adapted to receive, as a result of sockets 22 and 23 respectively therein, the wheels 14 and 15. Circumferentially within the sockets 22 and 23 are respectively circumferential rings 24 and 26 which frictionally engage the respective sprockets to the associated wheels whereby rotation of the wheels imparts corresponding rotation to the sprocket. Each sprocket has a protruding axis 33 which is rotationally held by the respective supporting members 18 and 19 to permit rotation of the respective sprockets. A platform 34 is attached to the top of the housing 11 and is adapted to carry a portable tape cassette 50 having two rotatable spools 51 and 52 therein with magnetic tape 53 wound from spool 51 to the other spool 52. The cassette 50 is constrained in position on the surface 34 by peripheral guide bracket 61. The platform 34 also has an orifice 36 disposed therethrough generally center of the brackets 61. Through the orifice 36 projects an idler mechanism 55 consisting of two vertically disposed friction engaging wheels 56 and 57 having rubber circumferences and a counter balance wheel 58 carried on the same vertical axis 59, which is held rigidly upright by support bracket 60. The lower idler wheel 56 is adapted to frictionally engage the circumference of the take-up sprocket 21 and thus is disposed below the platform 34 while the upper idler 57 is disposed above the platform in registry with the upper of one of the circumferential margins 59' of the take-up spool 52 of the cassette 50. The upper idler 57 in fact frictionally engages the circumferential margin 59' so that as the take-up wheel 21 rotates the upper idler 57 also rotates and imparts rotation to the take-up spool 52 to thereby cause the magnetic tape 53 to travel from the feed spool 51 to the take-up spool 52 that are rotatably mounted on vertical axes 62 and 64.

Also supported by the platform 34 by vertical member 60 is a magnetic tape transcription head 63 disposed in registry with that portion 53' of magnetic tape 53 disposed between the spools 51 and 52 when the cassette 50 is mounted between the brackets 61 on platform 34 whereupon engagement of the magnetic tape portion 53' occurs with the head 63. The head 63 is more particularly disposed against the tape portion 53' between the spools 51 and 52 so that as the tape travels from spool 51 to spool 52 as a result of the rotation imparted to the spool 52 by the friction wheel 57, that existing portion 53' against the head 63 is urged against the head by a back-felt-spring combination 70 of cassette 50 whereupon the head 63 translates the variations in the magnetic field generated by the travelling tape 53 into electrical impulses, which by conductor 67 are conveyed to an output jack 68 at the rear of the housing 10 for connection to the input jack (not shown) of the dictating machine 17 as through a preamplifier (not shown).

As can now be appreciated by use of the circumferential rings 24 and 26 the adapting drive mechanism can be placed over the protruding take-up and feed wheels of the dictating machine 17 or removed at will and the only other physical connection which needs to be performed is the electrical connection between the head 63 and the dictating machine as by conductor 67.

It should be further noted that the protruding brackets 61 are disposed to respectively receive with ease the cassette 50 and thus the cassette is capable of being easily placed or removed from the platform. This facility permits the transcription of any cassette as may be required by the user.

The embodiments of the invention in which an exclusive property or privilege is claimed are defined as follows:

1. In combination with the cassette having take-up and feed spools with magnetic tape wound from one spool to the other, an adapting drive mechanism for use on a magnetic tape transcription machine having protruding take-up and feed wheels that rotate on vertical axes, whose perimeter protrudes from the said machine, said driving mechanism including a housing, a read head attached to said housing for reading a travelling magnetic tape; means for receiving in engagement with said read head a portion of magnetic tape travellingly disposed between take-up and feed spools of the cassette, said spools having their peripheries exposed at the center of the cassette; the improvement consisting of a drive transfer mechanism for transferring rotary motion from the feed wheel of the transcription machine to the take-up spool of the adaptor, the drive transfer mechanism comprising:

a. a rotatable annular member carried by the housing to rotate about a vertical axis, said member having exterior perimeter surface and inner engaging means mounted on its interior perimeter surface adapted to engage over the protruding perimeter of the feed wheel of the transcribing machine whereby the rotation of the feed wheel rotates the annular member; and b. upper and lower idler wheels fixedly mounted on a vertically disposed axle, the lower idler wheel frictionally engaging and being rotated by the moving exterior perimeter surface of the annular member, the upper idler wheel being rotated by the rotation of its axle and the lower idler wheel, said upper idler wheel being adapted to frictionally engage the periphery of the take-up spool of the cassette to thereby rotate the same.

2. A combination as in claim 1, wherein the exterior perimeter of the annular member is coaxial with the periphery of the take-up spool of the cassette and the upper and lower idler wheels have the same diameter to drive the take-up spool at the same speed as the annular member.

3. A combination as in claim 1, wherein a pair of similar rotatable annular members are carried by the housing, each of said annular members being adapted to engage over the protruding perimeters of the take-up and feed wheels of said transcription machine respectively, whereby to hold said adapting drive mechanism in position on said transcribing machine with said lower idler wheel in frictional engagement with the protruding perimeter of the annular member engaged over the feed wheel of the machine.

4. A combination as in claim 3, wherein each of said annular members has inner engaging means in the form of a ring surrounding the interior perimeter of each of said annular members, said rings being adapted to frictionally engage the annular members on their respective take-up and feed wheels of the transcribing machine.

5. A combination as in claim 3, wherein said upper and lower idler wheels are spaced apart vertically on said axle to which they are fixed, a counter balance wheel is fixed to the same axle as are the idler wheels, and said counter balance wheel is positioned on said shaft between said idler wheels.

* * * * *